United States Patent Office 2,950,275
Patented Aug. 23, 1960

2,950,275
AZO-DYESTUFFS INSOLUBLE IN WATER

Herbert Kracker and Hans Albert, Offenbach (Main), Germany, assignors to Farbwerke Hoechst Aktiengesellschaft vormals Meister Lucius & Brüning, Frankfurt am Main, Germany, a corporation of Germany No Drawing. Filed Oct. 14, 1958, Ser. No. 767,096

Claims priority, application Germany Oct. 19, 1957

6 Claims. (Cl. 260—188)

The present invention relates to new azo-dyestuffs insoluble in water and to a process for preparing the same; more particularly it relates to dyestuffs corresponding to the following general formula:

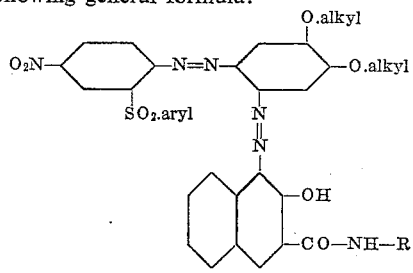

wherein R represents an aromatic radical.

We have found that azo-dyestuffs insoluble in water having valuable properties are obtained by coupling in substance, on the fiber or on another substratum the diazonium compound from an ortho-amino-azo compound of the general formula

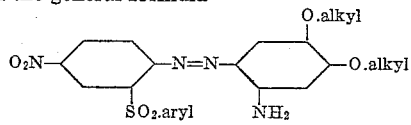

with an arylamide of 2,3-hyroxynaphthoic acid which is free from groups imparting solubility in water.

The new dyestuffs yield on vegetable fibers, including fibers from regenerated cellulose, according to known dyeing and printing methods, mainly greenish brown to green dyeings and prints of good fastness properties.

The dyestuffs can also be prepared in substance or on a substratum and may be used for coloring high molecular plastic masses or for the manufacture of color lakes.

The ortho-amino-azo compounds used as diazo components can be prepared by known methods. It is suitable to use for the manufacture of the new dyestuffs the solid, stable diazonium compounds which are obtained by the process described in our U.S. patent application Serial No. 762,211, filed September 22, 1958, for "Solid, Stable Diazonium Compounds."

The following examples serve to illustrate the invention but they are not intended to limit it thereto:

EXAMPLE 1

Cotton fabric is padded on the foulard with the following solution and dried:

12 grams of 2,3-hydroxynaphthoylaminobenzene are pasted with
20 grams of Monopol Brilliant oil, and
18 cc. of sodium hydroxide solution of 38° Bé. and the whole is made up to 1 liter with boiling water.

The dried fabric is printed with a printing paste containing, per kilogram, 10.7 grams of 2-amino-4,5-diethoxy-2'-phenylsulfonyl-4'-nitro-1,1'-azobenzene in the form of a diazonium compound prepared in the usual manner, 1 gram of a reaction product from about 20 mols of ethylene oxide and 1 mol of octodecyl alcohol, 20 cc. of acetic acid of 50% strength, and tragacanth as thickening agent.

The fabric is then dried, washed with hot dilute sodium carbonate solution, rinsed, soaped for 10 minutes at 95° C. with a solution containing, per liter of water, 1 gram of a reaction product from about 10 moles of ethylene oxide and 1 mol of isododecyl phenol, and furthermore 3 grams of sodium carbonate, rinsed again and dried. A dull green print is obtained.

When in the above example 2-amino-4,5-di-n-propoxy-2'-phenylsulfonyl-4'-nitro-1,1'-azobenzene is used instead of 2 - amino-4,5-diethoxy-2'-phenylsulfonyl-4'-nitro-1,1'-azobenzene, a similar print is obtained.

EXAMPLE 2

Cotton fabric is padded on the foulard with the following solution and dried:

16.2 grams of 1 - (2',3' - hydroxynaphthoylamino) - 2,4-dimethoxy-5-chlorobenzene are pasted with
20 grams of Monopol Brilliant oil,
14 cc. of sodium hydroxide solution of 38° Bé., and
100 cc. of water, boiled and the whole is made up to 1 liter with water containing per liter
5 grams of Monopol Brilliant oil and
2 cc. of sodium hydroxide solution of 38° Bé.

The dried fabric is developed on the foulard with a solution containing, per liter of water, 10.7 grams of 2-amino-4,5-diethoxy - 2' - phenylsulfonyl-4'-nitro-1,1'-azobenzene in the form of a diazonium compound prepared in the usual manner, 1 gram of a reaction product from about 20 mols of ethylene oxide and 1 mol of octodecyl alcohol and 20 cc. of acetic acid of 50% strength.

After an air passage for about 30 seconds, the material is rinsed first, for 10 seconds at 80–90° C. It is then rinsed in the cold and soaped for 10–20 minutes at 95° C. with a solution containing, per liter of water, 1 gram of a reaction product from about 10 mols of ethylene oxide and 1 mol of isododecylphenol, and furthermore 3 grams of sodium carbonate, rinsed again and dried. A yellowish green of good fastness properties is obtained.

EXAMPLE 3

Cotton yarn on cross-wound bobbins is treated in a closed apparatus for 45 minutes at 35° C. in a goods-to-liquor ratio of 1:15 in the following impregnation bath, rinsed with a solution containing, per liter of water, 20 grams of sodium chloride and 1 cc. of sodium hydroxide solution of 38° Bé., and developed at 15° C. in the developing bath described below. The material is then soaped in the usual manner rinsed and dried.

Impregnation bath 9.6 grams of 1-(2',3'-hydroxynaphthoylamino)-2-methoxy-4-chloro-5-methylbenzene are dissolved in
16 cc. of denatured alcohol,
3.2 cc. of a sodium hydroxide solution of 38° Bé.,
12 cc. of water, and
4.8 cc. of a formaldehyde solution of 33% strength and the whole is made up to 8 liters with water of 35° C.
24 grams of a condensation product from high molecular fatty acids and protein degradation products, and
80 cc. of sodium hydroxide solution of 38° Bé.

Developing bath 9.5 grams of 2-amino-4,5-diethoxy-2'-phenylsulfonyl-4'-nitro-1,1'-azobenzene in the form of a diazonium compound prepared in the usual manner are dissolved in 8 liters of water containing
8 grams of a reaction product from about 20 mols of ethylene oxide and 1 mol of octodecyl alcohol, and 40 cc. of acetic acid of 50% strength.

A yellowish green dyeing of good fastness properties is obtained.

EXAMPLE 4

47 grams of 2-amino-4,5-diethoxy-2'-phenylsulfonyl-4'-nitro-1,1'-azo-benzene in the form of the diazonium sulfate are dissolved in 4 liters of water. Into this diazo solution is run, while stirring well, a solution of 30 grams of 1 - (2',3'-hydroxynaphthoylamino)-2-methoxybenzene in dilute sodium hydroxide solution. The coupling is completed by gradually heating to 90° C. The greenish black dyestuff so obtained is filtered off, washed well and dried.

The coupling can also be carried out in the presence of a substratum adapted for the preparation of color lakes.

The following table indicates a number of further components which can be used in this invention, and also the tints of the azo-dyestuffs produced from these components on the fiber, which likewise possess good fastness properties.

| Diazo component | Coupling component | Tint |
| --- | --- | --- |
| 2 - amino - 4,5 - diethoxy - 2' - phenylsulfonyl - 4'-nitro-1,1'-azobenzene | 1 - (2',3' - hydroxynaphthoyl - amino)- 4-methoxybenzene | dull green. |
| Do | 1 - (2',3'-hydroxynaphthoyl-amino) -2, 4-dimethylbenzene | covered green. |
| Do | 1 - (2',3' - hydroxynaphthoyl - amino) - 2-methyl-4-methoxy-benzene | dull green. |
| Do | 1 - (2',3' - hydroxynaphthoyl - amino) - 2,5-dimethoxybenzene | covered yellowish green. |
| Do | 2 - (2',3' - hydroxynaphthoyl-amino) - naphthalene | dull grey-green. |
| Do | 1 - (2',3' - hydroxynaphthoyl-amino) - 2,5-dimethoxy-4-chlorobenzene | yellowish green. |
| Do | 1 - (2',3' - hydroxynaphthoyl - amino) - 3-nitrobenzene | covered yellowish green. |
| Do | 1 - (2',3' - hydroxynaphthoyl - amino) - naphthalene | covered bluish green. |
| Do | 1 - (2',3' -hydroxynaphthoyl - amino) - 4-ethoxybenzene | dull green. |
| Do | 1 - (2',3' - hydroxynaphthoyl - amino) - 2,3-dimethylbenzene | covered green. |
| Do | 1 - (2',3' - hydroxynaphthoyl - amino) - 2-methoxybenzene | brownish green. |
| 2 - amino - 4,5 - dimethoxy - 2' - phenylsulfonyl- 4'-nitro-1,1'-azobenzene | 1 - (2',3' - hydroxynaphthoyl - amino) - 2-methyl-4-methoxy-benzene | covered green. |
| Do | 1 - (2',3' - hydroxynaphthoyl - amino) - 4-methoxybenzene | yellowish brown. |
| Do | 1 - (2',3' - hydroxynaphthoyl - amino) - 4-ethoxybenzene | grey brown. |
| Do | 1 - (2',3' - hydroxynaphthoyl - amino) - 2,4-dimethoxy-5-chlorobenzene | covered yellowish green. |
| Do | 1 - (2',3' - hydroxynaphthoyl - amino) - 2,5-dimethoxy-4-chlorobenzene | Do. |
| Do | 1 - (2',3' - hydroxynaphthoyl - amino) - 2,3-dimethylbenzene | covered green |
| Do | 1 - (2',3' - hydroxynaphthoyl - amino) - 2,5-dimethoxybenzene | covered yellowish green. |
| Do | 2,3-hydroxynaphthoyl-aminobenzene | brownish green. |
| Do | 1 - (2',3' - hydroxynaphthoyl - amino) - 2-methyl-4-chlorobenzene | Do. |

Obviously many modifications and variations of the present invention are possible in the light of the above teachings. It is, therefore, to be understood that within the scope of the appended claims the invention may be practiced otherwise than as specifically described.

We claim:

1. Azo-dyestuffs insoluble in water which correspond to the following general formula:

wherein X represents a lower alkyl group and R represents a member selected from the group consisting of phenyl, methoxyphenyl, ethoxyphenyl, dimethoxyphenyl, methylphenyl, dimethylphenyl, methyl-methoxyphenyl, methyl-chlorophenyl, dimethoxy-chlorophenyl, methoxy-chloro-methylphenyl, nitrophenyl and naphthyl.

2. The azo-dyestuff which corresponds to the following formula:

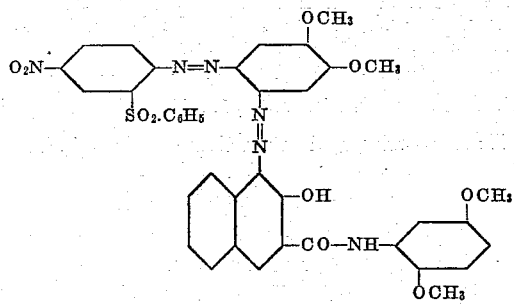

3. The azo-dyestuff which corresponds to the following formula:

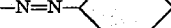

4. The azo-dyestuff which corresponds to the following formula:
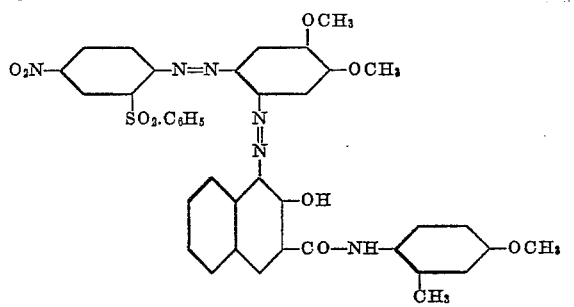
5. The azo-dyestuff which corresponds to the following formula:
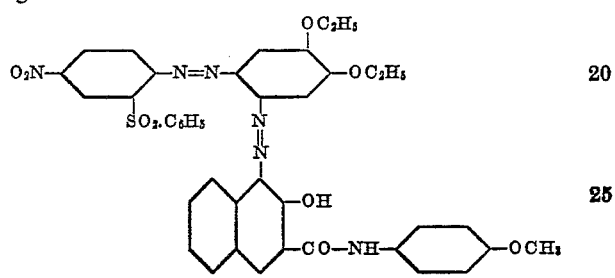
6. The azo-dyestuff which corresponds to the following formula:
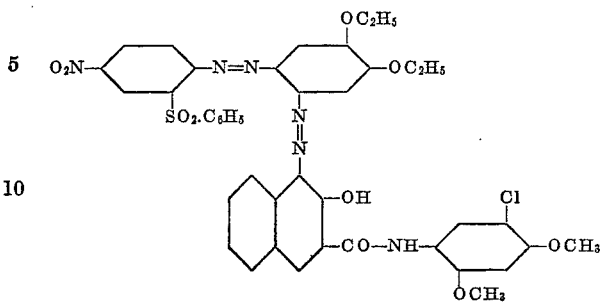
References Cited in the file of this patent
UNITED STATES PATENTS
2,105,919      Hoffa et al. _____ Jan. 18, 1938